J. B. DAVISON.
Churn.
No. 42,354.
Patented April 19, 1864.
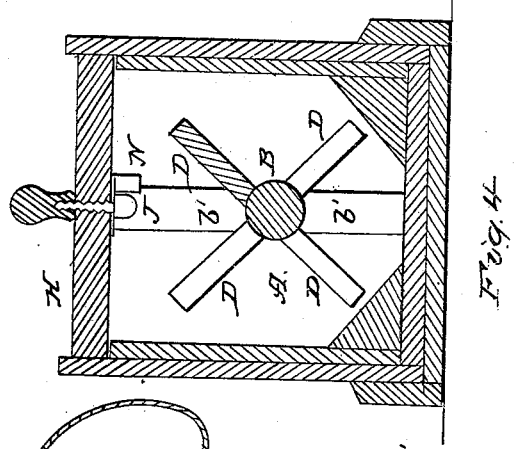
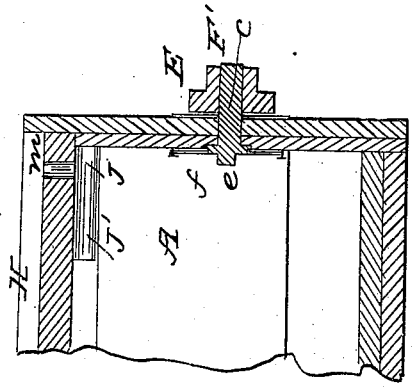
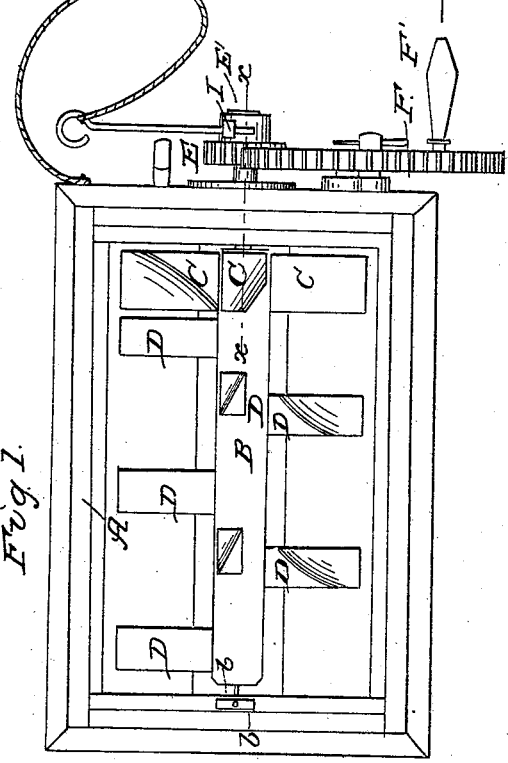
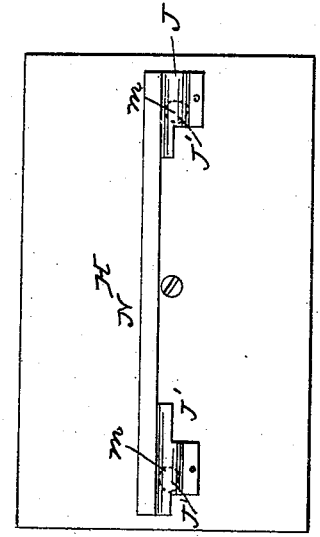

UNITED STATES PATENT OFFICE.

J. B. DAVISON, OF OBERLIN, OHIO.

IMPROVED CHURN.

Specification forming part of Letters Patent No. 42,354, dated April 19, 1864.

*To all whom it may concern:*

Be it known that I, J. B. DAVISON, of Oberlin, in the county of Lorain and State of Ohio, have invented certain new and useful Improvements in Churns; and I do hereby declare that the following is a full and complete description of the construction and operation of the same, reference being had to the accompanying drawings, making a part of this specification, in which—

Figure 1 is a top view with the cover removed. Fig. 2 is a transverse vertical section. Fig. 3 is a view of the under side of the cover. Fig. 4 is a vertical section of the churn in the direction of the line $x\ x$ in Fig.1.

Like letters of reference denote the same parts in the several views.

In the drawings, A represents the churn; B, the shaft, with revolving beaters C and D. This shaft is supported and kept in place at one end by means of the journal $b$ of the shaft resting and turning in the slide $b'$, which forms two sections, coming together at the point where the journal revolves. The upper section can be removed when it is desired to lift out the shaft. The other end of the shaft has a metallic piece, $a$, Fig. 1, on the end, and is slotted so as to fit onto the end $c$, Fig. 4, of the shaft $c'$ of the pinion E. On this shaft is a collar, $d$, fitted into the end of the churn where it passes through, and around this collar is a metallic plate, $f$, forming a tight joint around the collar, thereby preventing the cream from working in round the shaft, or from being colored by coming in contact with it, and there is less liability of leakage. The pinion E is secured to the shaft $c'$ by means of the thumb-screw I in the hub E' of the pinion. The object of having the pinion secured to the shaft in this way is that it can be more thoroughly cleaned, preventing rust, and the shaft can be more easily tightened as it wears away. The pinion is operated by the gear-wheel F, which is turned by the crank F'.

H is the lid or cover of the churn, the under side of which is represented by Fig. 4, showing the break N and guards J at the ends, over the air-holes $m$. (Shown in Fig. 4, and indicated by the dotted lines in Fig. 3.) These guards extend along the break N in the form of lips J', and they might extend the whole length of the lid forming the break, in this way answering a double purpose of breaking the cream and preventing the cream from being thrown up into the air-holes.

The revolving beaters C and D are straight on one side, and curved or beveled on the other, as represented in Fig. 1, the straight side being turned forward in churning, as it more effectually breaks the cream, and the beveled side in gathering the butter, the motion of the shaft having to be reversed. The four beveled beaters C at one end move round under the guards, and break in such a way as to draw in the air from the top and force it through the cream, passing out at the air-hole in the other end, causing a constant current of fresh air through the spray of the cream the whole length of the churn. The break N in the cover is for throwing back the cream as it is thrown up by the beaters, more effectually agitating the cream.

In the operation of this churn a swift motion is given to the cream in a current of air, churning it effectually in the shortest time, and by reversing the motion of the beaters the butter is gathered at one end of the churn. The gathering of the butter is facilitated by the beaters being inserted on the shaft on the form of a screw. To take out the shaft with the beaters, remove the upper section of the slide $b'$ by tipping it forward and lift out the shaft.

In cleansing the churn, take off the plate $f$, return the shaft to its place, put in water, and turn the crank rapidly. By means of the thumb-screw the pinion and its shaft can be removed, wiped dry, and returned to their place.

What I claim as my improvement, and desire to secure by Letters Patent, is—

1. The special arrangement of the break N, guards J, and lips J', in combination with the described revolving beaters, when operating conjointly as and for the purpose described.

2. The plate $f$ and collar $d$ on the shaft $c'$ and the slide $b'$, when arranged and operating in combination with the described churn, substantially as set forth.

J. B. DAVISON.

Witnesses:
W. H. BURRIDGE,
J. HOLMES.